May 2, 1961 H. T. PROBASCO 2,982,588
SHAFT BEARING AND PART MOUNTING CONSTRUCTION
Filed Nov. 3, 1958
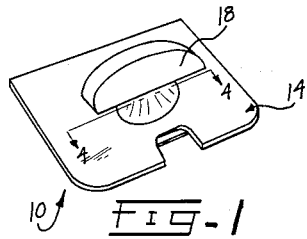
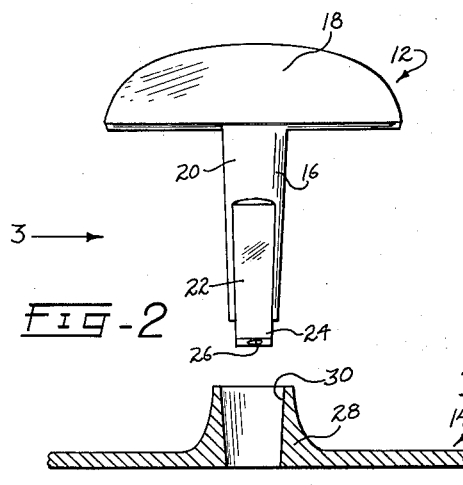
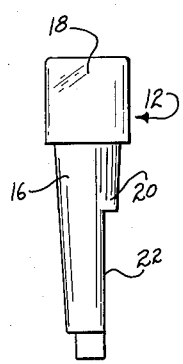
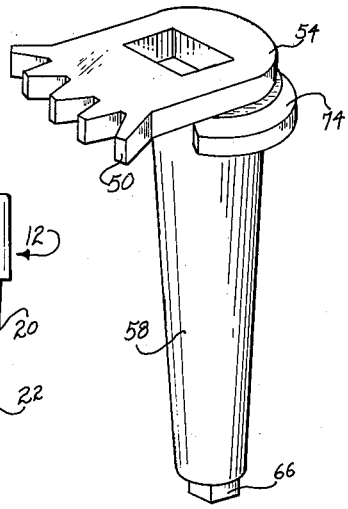
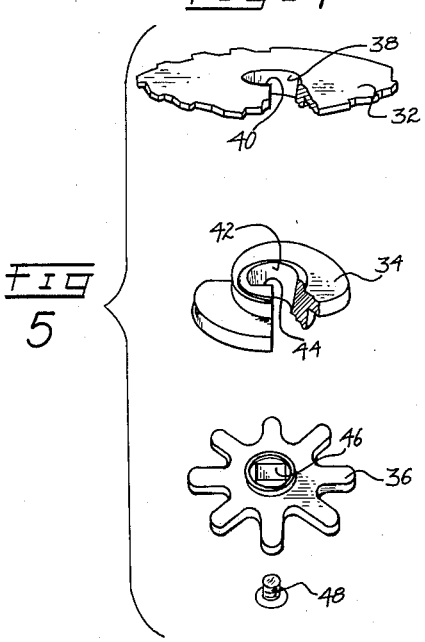
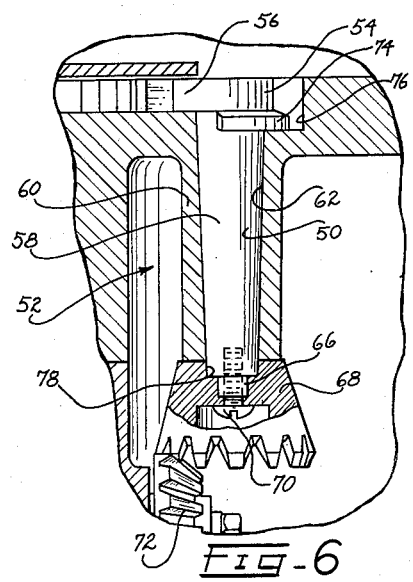
HAROLD T. PROBASCO
INVENTOR.
BY Thomas T. Mahoney
ATTORNEY

United States Patent Office 2,982,588
Patented May 2, 1961

2,982,588

SHAFT BEARING AND PART MOUNTING CONSTRUCTION

Harold T. Probasco, Burbank, Calif., assignor to Oak Manufacturing Co., Inc., Culver City, Calif., a corporation of California Filed Nov. 3, 1958, Ser. No. 771,458

1 Claim. (Cl. 308—237)

This invention relates to a shaft bearing and part mounting construction for utilization in supporting a shaft for rotation in a bearing and for further utilization in securing a plurality of parts to said shaft for rotation thereby.

In many devices die cast component parts are utilized instead of parts made from machined steel and the like because the die casting process enables considerable economies in the fabrication of component parts to be achieved. However, it has been conventional where a die cast part is mounted for rotation in a bearing to incorporate in the die cast part a steel shaft receivable in the bearing due to the fact that it is not possible to cast a shaft of uniform cross section throughout the length thereof by the die casting process. Therefore, it has been accepted that a die cast part mounted for rotation should include a steel shaft insert which is either cast into the die cast part during the die casting process or which is subsequently affixed thereto as by staking, the utilization of auxiliary fasteners, or other conventional means.

It is, therefore, an object of my invention to provide a bearing construction for rotary die cast parts which eliminates the necessity for the incorporation in the rotatable part of a steel shaft adapted to engage the bearing which supports the rotatable die cast part and which thus materially reduces the cost of fabricating and assembling the rotatable die cast part.

Another object of my invention is the provision of a rotatable die cast part of the aforementioned character which includes an integral, elongated shank, said shank being characterized by a circular cross section and having at least a portion thereof constituting a bearing portion and said bearing portion being of uniform taper from one extremity to the other thereof.

Another object of my invention is the provision of a die cast bearing member which includes a bearing bore having a uniformly tapered wall which conforms to the taper of the aforementioned bearing section on the elongated shank of the die cast rotatable member. Since both the rotatable member and the supporting bearing therefor are die cast and since the inherent necessity for the provision of draft on the elongated shank and in the bearing bore is thus constructively utilized, the cost of producing the rotatable part of the combination is greatly reduced since it is no longer necessary to provide a steel mounting shaft for the rotatable part and since both the rotatable part and the supporting bearing therefor can be manufactured by the economical die casting process.

It is, of course, frequently necessary to mount one or more objects upon the shank of the above described rotatable member and when said objects are mounted upon said shank the rotatable member serves as a supporting or mounting member for said objects in order that they may be rotated concomitantly with the rotation of said rotatable member.

Another object of my invention is the provision of a combined, die cast bearing and supporting construction wherein each of the objects supported on the uniformly tapered shank of the above described rotatable member incorporates a bore or opening having a taper whose cross section corresponds to the taper of that portion of the shank upon which the object is mounted in order that the object may be accurately located along the length of the shank and in order that it may be manufactured by the die casting process and still be accurately engaged upon said shank.

Another object of my invention is the provision of a mounting construction of the aforementioned character wherein the shank of the rotatable member incorporates a flat extending longitudinally thereof and wherein the mounted object incorporates a similar flat in the bore or opening therein adapted to engage the flat on the shank in order to prevent relative rotation between said shank and said object.

Therefore, it is possible to achieve an adequate bearing and to accurately mount the parts upon the shank of the rotatable member by the use of the die casting process alone and the necessity for the inclusion of steel shafts and the like in the die cast parts is obviated by the practice of the teachings of my invention with the consequent economies resulting therefrom.

Other objects and advantages of my invention will be apparent from the following specification and the accompanying drawing which is for the purpose of illustration only and in which:

Fig. 1 is a perspective view showing a coin receiver adapted to be utilized in conjunction with a dispensing mechanism and incorporating component parts fabricated in accordance with the teachings of my invention;

Fig. 2 is a side elevational view of a die cast rotatable part incorporated in the aforementioned coin receiver;

Fig. 3 is a side elevational view taken from the direction of the arrow 3 of Fig. 2;

Fig. 4 is an enlarged, fragmentary, sectional view taken on the broken line 4—4 of Fig. 1;

Fig. 5 is an exploded view showing various die cast objects adapted to be mounted in conjunction with the shank of the rotatable member;

Fig. 6 is an enlarged, fragmentary, sectional view showing a die cast shaft and die cast bearing therefor constructed in accordance with the teachings of my invention; and Fig. 7 is an enlarged, perspective view of the rotatable member of Fig. 6.

Referring to the drawing and, more particularly, to Figs. 1–5 thereof, I show a coin receiver 10, the various component parts of which have been fabricated in accordance with the teachings of my invention and which include a rotatable die cast member 12 and a supporting bearing plate 14 adapted to be utilized in conjunction therewith.

The rotatable die cast member 12 is adapted to serve as the actuator for the coin receiver 10 and includes an elongated shank 16 having a handle 18 formed integrally with the upper extremity thereof. The shank 16 is of generally circular cross section and incorporates a bearing portion or section 20 which tapers uniformly from one extremity to the other extremity thereof. Of course, the length of the bearing portion or section 20 is determined by the length of the supporting bearing in which it is to be located, as will be apparent from the disclosure hereinafter. In addition, while the principles of the invention are exemplified as embodied in various constructions pertinent to the dispenser art, it is, of course, obvious that the teachings are applicable with equal cogency to the fabrication of various types of parts in all types of mechanisms.

Below the bearing section 20, the shank 16 continues its uniform taper and is, in addition, provided with an elongated flat 22 thereupon. At its lower end, the shank incorporates a substantially square protrusion 24 having a threaded hole 26 therein.

The supporting bearing plate 14 actually constitutes the front of the receiver 10 and incorporates a centrally located boss 28 having a tapered bearing bore 30 therein. The supporting bearing plate 14 is die cast, as is the rotatable member 12, and the taper of the wall of the bearing bore 30 is produced by permitting the proper draft on the pin defining said bore. In any event, the diameter of the bore 30 at any given point is equivalent to the diameter of the corresponding portion of the bearing section 20 of the shank 16 located in said bore. Thus, it is possible to obtain an adequate bearing for the shank 16 within the bore 30 without the necessity for the utilization of the conventional steel inserts previously considered necessary.

Another factor in the successful operation of the shank 16 within the bore 30 lies in the pre-lubrication of the shank 16 accomplished by the application of lubricating parting compounds to the dies prior to the casting of the various parts therein. Thus, as the parts come from the dies they are coated with lubricant and it is normally not necessary to apply lubricant thereto. Also of interest is the fact that during the tumbling process when flash is removed from the die cast parts a microscopic coating of fine die casting material accumulates on the parts and also serves, in conjunction with the parting compound, as a lubricant for the shank 16 of the rotatable member 12 in the bore 30 of the bearing plate 14.

It is, of course, frequently necessary to provide objects which are mounted or supported upon the shank 16 of the rotatable member 12 and such supported objects are shown generally in Fig. 5 of the drawing as consisting, in the case of the coin receiver 10, of a coin wheel 32, a locating cam 34, and a gear wheel 36. The coin wheel 32 incorporates a bore or opening 38 which is tapered to correspond to the taper of the portion of the shank upon which the coin wheel is located and thus the diameter of the bore or opening 38 at any point along the length thereof is substantially equivalent to the corresponding diameter of the shank 16 at the place on the shank 16 where the coin wheel 32 is located. In addition, a flat 40 corresponding to the flat 22 on the shank 16 is incorporated in the bore 38 to prevent relative rotation between the coin wheel 32 and the shank 16.

In a similar manner, the locating cam 34 incorporates a bore or opening 42 whose side wall is tapered to correspond to the taper of the shank 16 when it is located on said shank below the coin wheel 32. The bore 42 also incorporates a flat 44 engageable on the corresponding flat 22 of the shank 16 to prevent relative rotation between the locating cam 34 and said shank.

The gear wheel 36 incorporates a square opening 46 which receives the square protrusion 24 and is maintained in operative relationship with said square protrusion by a screw 48, or similar fastener.

Therefore, the mounted objects constituted by the coin wheel 32 and locating cam 34 are accurately located along the length of the shank 16 automatically since the corresponding tapers of the bores 38 and 42 in the wheel 32 and cam 34, respectively, determine the positions which said parts will assume along the length of the shank 16. In addition, it is impossible to reverse the order of the location of the parts on the shank or to reverse the positions of the parts, which might cause malfunctioning of the assembly. Thus, the parts are automatically located in the correct position along the length of the shank 16 and in the correct orientation.

Another advantage arising from the utilization of the tapered shank 16 and the corresponding tapered bearing bore 30 is the elimination of the necessity for drilling or reaming out the bore in the die cast part which arises when a steel insert shaft of uniform cross section is utilized since, as previously explained, a bearing bore of uniform cross section cannot be cast into the bearing support by the die casting process.

Illustrated in Figs. 6 and 7 of the drawing is the manner in which the teachings of my invention can be applied in supporting a rotatable member 50 designed to transmit motion from one point to another in a dispensing mechanism, indicated generally at 52 in Fig. 6 of the drawing.

The rotatable member 50 includes a head portion 54 constituted, in part, by a sector or gear 56, said head portion having an elongated shank 58 formed integrally therewith. The shank or shaft 58 is of uniformly tapered cross section from one extremity to the other thereof and is fabricated by the die casting process. The shank or shaft 58 is adapted to be supported in a bearing 60, said bearing having a tapered bore 62 formed therein by die casting and the taper of said bore corresponding to the taper of the shaft 58.

The lower extremity of the shaft 58 is provided with a square protrusion 66 upon which is mounted a gear 68 secured in operative relationship with said protrusion by a screw 70. Therefore, when the gear 68 is rotated by a corresponding gear 72, the shaft 58 is caused to rotate in the bore 62 to cause corresponding rotation of the sector gear 56. A radially extending land 74 is provided on the rotatable member 50 to engage the bottom wall of a corresponding recess 76, as best shown in Fig. 6 of the drawing.

Therefore, by the utilization of the teachings of my invention, the necessity for the incorporation of a steel shaft for mounting the sector gear in the dispensing mechanism 52 is eliminated and the corresponding necessity for reaming or otherwise properly sizing the bore 62 of the bearing 60 is obviated.

It will also be noted that the gear 68 is provided with a tapered socket 78 therein adapted to receive the tapered lower extremity of the shaft 58 in a manner analogous to that in which the various mounted objects of the previously described embodiment of the invention are provided with tapered bores or openings therein.

By the utilization of the teachings of my invention, it is possible to achieve significant reductions in the cost of manufacturing die cast parts and to achieve corresponding economies in the assembly of said parts with one another. In addition, due to the use of lubricants necessary in the die casting process, the parts are inherently permanently lubricated and an auxiliary lubricating effect is achieved by the comminution of die casting material resulting from the tumbling of the die cast parts to remove flash therefrom.

I claim:

In a composite structure, the combination of: a die cast supporting member having an elongated shank incorporating an elongated, uniformly tapered mounting portion, said uniformly tapered mounting portion having a flat thereupon; a plurality of objects mounted on said mounting portion and each having a bore defined by a tapered wall conforming to the taper of said mounting portion and the flat thereupon at the point where a respective object is mounted to maintain said member and said objects in operative relationship; and retention means engageable with the extremity of said shank and an adjacent one of said objects to maintain said objects in operative engagement with said shank.

References Cited in the file of this patent

UNITED STATES PATENTS

| | | |
|---|---|---|
| 240,640 | Barnes | Apr. 26, 1881 |
| 988,219 | Spalding | Mar. 28, 1911 |
| 1,081,768 | Nash | Dec. 16, 1913 |
| 1,998,728 | Marles | Apr. 23, 1935 |
| 2,015,918 | Brabant | Oct. 1, 1935 |

OTHER REFERENCES

Die Casting Practice, 1st edition, McGraw-Hill Book Co., pages 64 and 65 relied upon.

Die Casting by Herbert Chase, John Wiley & Sons, Inc., page 82 relied upon.